Aug. 26, 1924.  
C. KECK  
1,506,430
FUEL ECONOMIZER FOR INTERNAL COMBUSTION ENGINES
Filed June 16, 1921
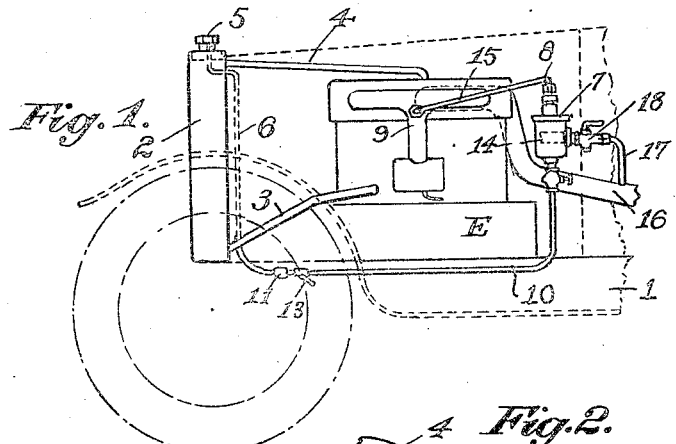
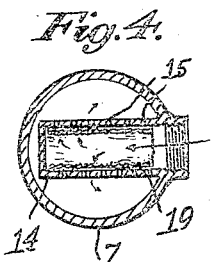
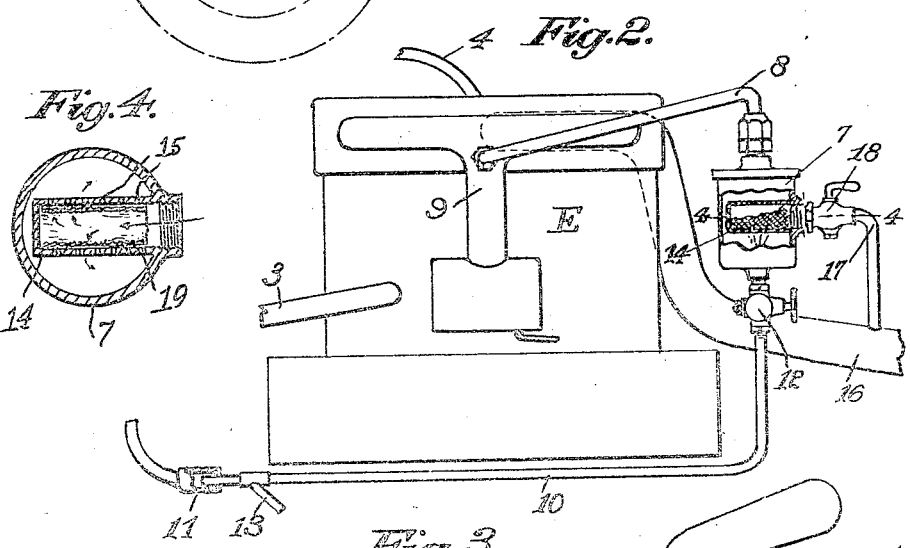
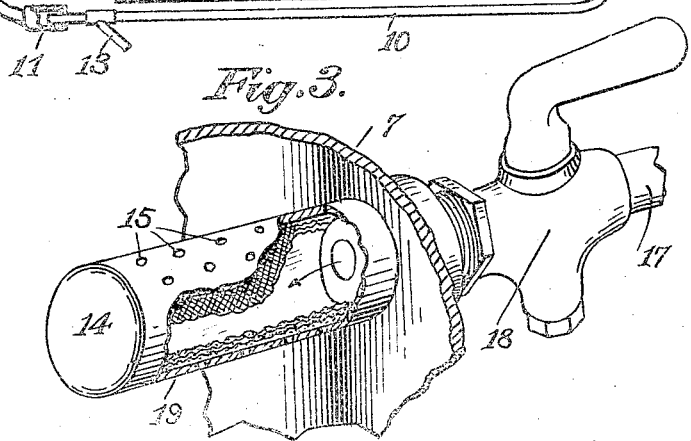
Inventor  
Carl Keck  
By his Attorney  
John A. Seifert Patented Aug. 26, 1924.

1,506,430

UNITED STATES PATENT OFFICE.

CARL KECK, OF BROOKLYN, NEW YORK.

FUEL ECONOMIZER FOR INTERNAL-COMBUSTION ENGINES.

Application filed June 16, 1921. Serial No. 478,197.

*To all whom it may concern:*

Be it known that I, CARL KECK, citizen of Latvia, and resident of Brooklyn and State of New York, have invented certain new and useful Fuel Economizers for Internal-Combustion Engines, of which the following is a specification.

This invention relates to fuel economizers for internal combustion engines, particularly adapted for use in connection with motor vehicles, and it is the object of the invention to provide regulable means to control the richness of the fuel mixture and to supply vapor, and additional air both heated and at atmospheric temperature to the combustible mixture to increase the combustible qualities thereof and prevent carbonization of the fuel, and to provide a device of this character which is simple in construction and operation and highly efficient in use.

A further object of the invention relates to fuel economizing means whereby heated air and vapor with air at atmospheric temperature may be supplied to the combustible mixture simultaneously, or only heated air, or vapor and air at atmospheric temperature supplied to the combustible mixture.

In carrying out the invention I provide a casing having a chamber, which is in the nature of a mixing chamber, said chamber having an outlet connected to the fuel intake of the engine and having an inlet in the wall opposite and in line with the outlet connected in communication with the usual water cooling radiator above the liquid level therein whereby to draw vapor, such as steam, from the radiator, said connection having a restricted air inlet to combine air with said vapor. The casing chamber is also arranged for connection with the exhaust outlet manifold of an internal combustion engine, such inlet to the casing being to a perforate tube, which is preferably lined with gauze; extending transversely into the chamber in interposed relation to the inlet for the vapor and outlet in the path of the vapor entering the chamber.

In the drawing accompanying and forming a part of this specification, Figure 1 is a side elevation of the forward portion of a motor vehicle showing an internal combustion engine and liquid cooling radiator connected in circulation with the jacket of said engine mounted therein with an embodiment of the invention applied thereto.

Figure 2 is an enlarged view showing my improved economizer applied to an internal combustion engine and showing the connection thereof with the overflow pipe in section as well as the casing for connecting the vapor and auxiliary air inlet and exhaust to the fuel intake of the engine.

Figure 3 is an enlarged fragmentary sectional view in perspective of the connection of the exhaust outlet with the casing chamber; and Figure 4 is an enlarged sectional view of the casing taken on the line 4 of Figure 2.

In the drawing I have shown an embodiment of my invention in connection with an internal combustion engine E mounted in a conventional manner in the frame 1 of a motor vehicle, the engine being of the water cooled type having a water jacket surrounding the cylinders with the inlet connected in circulation with the outlet of a water cooling radiator 2 by a pipe 3, and an outlet connected by pipe 4 with the inlet of said radiator. The radiator is mounted upon the vehicle frame forwardly of the engine and has a filler opening in a portion 5 projecting up from the top of the radiator with a removable closure therefor. An overflow pipe 6 leads from the top of the radiator, said pipe extending through the rear wall of the top header of the radiator to below the radiator as is usual.

A casing 7 having a chamber has an outlet in one end wall connected by a pipe 8 with the manifold fuel intake 9 of the engine. The casing chamber 7 is connected to the atmosphere and the radiator above the liquid level therein to supply moistened air or vapor to the casing chamber and thereby to the fuel entering an engine cylinder through the fuel intake by a pipe 10 connected to the outlet of the radiator overflow pipe 6, which may be a slip joint connection as shown at 11, the connection of said pipe with the casing chamber 7 being regulable by a suitable valve 12. The connection of the pipe 10 with the casing chamber is through the wall of the casing opposite to and in line with the outlet from the chamber connected with the outlet pipe 8. The pipe 10 has an air inlet connected to the atmosphere between the connection of said pipe with the casing chamber 7 and the overflow pipe 6, this being in the nature of a Y coupling or union interposed in the pipe 10 with one leg of the Y having a restricted opening and open to the atmosphere as shown at 13, said leg being arranged to incline rearward at an acute angle to the direction of flow through the pipe to the casing chamber so that the inflow of air is opposite to the direction of the flow of vapor through the pipe. By this arrangement the suction through the pipe 10, created by the movement of the engine pistons through the pipe 8 and casing chamber 7, will be greatest with the connection of the pipe 10 with the overflow pipe of the radiator and the radiator. This arrangement of the air inlet 13 also prevents the drawing or siphoning of the water from the radiator to the casing chamber 7 and from the latter through pipe 8 with the engine cylinder through the intake manifold as well as the carburetor connected to said fuel intake manifold. Furthermore, any overflow of water from the radiator through the overflow pipe 6 is readily discharged through said air inlet 13 without any possibility of water lodging or becoming pocketed in the pipe 10.

The casing chamber 7 is arranged with a tubular member 14 having perforations 15 to extend transversely of the casing chamber in interposed relation to the inlet for the pipe 10 and to the outlet from said chamber in the path of the incoming vapor through the pipe 10, said tubular member having an inlet from the exterior of the casing connected to the exhaust outlet manifold 16 of the engine by a pipe 17 regulable by a suitable valve 18. The tubular member 14 preferably has a gauze lining of wire 19 to prevent combustible gases or flame from entering the casing chamber from the exhaust manifold with the possibility of being drawn into the intake manifold and preigniting the fuel, and also prevents the drawing off of the vapor from the casing chamber by the exhaust.

In operation to utilize the device after the engine has been started the valves 12 and 18 are opened to the desired extent either separately, or by means to simultaneously actuate said valves, connecting the casing chamber with the exhaust through pipes 17 and with the radiator above the liquid level therein and the atmosphere through the pipe 10 the suction of the engine piston drawing air through the inlet 13 to pipe 10 and steam or vapor from the radiator through the overflow pipe 6 which has combined therewith, air at atmospheric temperature, and heated air or the products of combustion from the exhaust pipe into the chamber casing. By arranging the inlet for the exhaust gases through the tubular member 14 in the path of the incoming vapor and air, the incoming heated air or gases from the exhaust will preheat said vapor and air before it is drawn into the fuel intake manifold facilitating the assimulating thereof with the fuel mixture.

As is well known, the addition of moist vapor to the fuel mixture of an internal combustion engine under certain conditions tends to facilitate the combustion of the fuel and a consequent increase in the temperature of said combustible mixture during combustion thereof with the result that it tends to loosen and burn carbon deposits which may have accumulated on the walls of the combustion chamber of an engine cylinder and deliver the same with the products of combustion through the exhaust outlet. For this purpose the pipe 10 may be connected with the casing chamber through its valve connection therewith independent of the connection of said chamber with the exhaust outlet. Furthermore, to facilitate the operation when the engine is started, particularly in cold weather, or to preheat the fuel charge, the casing chamber 7 is connected to the exhaust manifold independent of the pipe 10.

Having thus described my invention I claim:

1. In a device of the class specified, the combination with an internal combustion engine having a fuel intake, an exhaust outlet and water cooling jacket, and a liquid cooling radiator in circulation with the water jacket of the engine, of a casing having a chamber with an outlet connected to the fuel intake of the engine, and connections with the exhaust outlet and the radiator above the liquid level therein to draw moist vapor therefrom, and an air inlet to said latter connection for the purpose specified.

2. In a device of the class specified, the combination with an internal combustion engine having a fuel intake, an exhaust outlet and a water cooling jacket, and a liquid cooling radiator in circulation with the water jacket of the engine, of a casing having a chamber with inlet connections with the exhaust outlet and the outlet of the radiator overflow pipe, said casing being arranged at a level higher than the outlet of said overflow pipe of the radiator, with means arranged in said latter connection to prevent siphoning of the liquid from the radiator, and an outlet from the casing chamber connected to the fuel intake of the engine.

3. In a fuel economizer for internal combustion engines, the combination with an internal combustion engine having a fuel intake and exhaust outlet, and a liquid cooling radiator having an overflow tube, of a casing having a chamber with the outlet connected to the fuel intake of the engine, a tube connected to the casing chamber through the wall opposite to and in line with the outlet thereof and connected to the overflow tube of the radiator, an air inlet to said tube between the connection thereof with the radiator overflow tube and the casing chamber, a tube connected to the exhaust outlet of the engine and a perforated tubular member interposed between the outlet of the casing chamber and the connection therewith of the tube connected to the overflow tube of the radiator, and valves in the connections of the casing chamber with the tube connected to the overflow tube of the radiator and the tube connected to the exhaust outlet of the engine for the purpose specified.

Signed at New York, in the county of Bronx and State of New York, this eleventh day of June, A. D. 1921.

CARL KECK.